(12) United States Patent
Neubauer

(10) Patent No.: US 8,070,832 B2
(45) Date of Patent: Dec. 6, 2011

(54) DISPERSE DYES, THEIR PREPARATION AND USE

(75) Inventor: Stefan Neubauer, Köln (DE)

(73) Assignee: DyStar Colours Deutschland GmbH (DE)

(*) Notice: Subject to any disclaimer, the term of this patent is extended or adjusted under 35 U.S.C. 154(b) by 65 days.

(21) Appl. No.: 12/672,597

(22) PCT Filed: Aug. 1, 2008

(86) PCT No.: PCT/EP2008/060114
§ 371 (c)(1),
(2), (4) Date: Apr. 8, 2010

(87) PCT Pub. No.: WO2009/019207
PCT Pub. Date: Feb. 12, 2009

(65) Prior Publication Data
US 2011/0247150 A1    Oct. 13, 2011

(30) Foreign Application Priority Data
Aug. 9, 2007    (DE) .................. 10 2007 037 522

(51) Int. Cl.
*D06P 5/17* (2006.01)
*C09B 29/00* (2006.01)

(52) U.S. Cl. ............. 8/464; 8/662; 8/690; 8/691; 8/692; 534/788

(58) Field of Classification Search .............. 8/464, 662, 8/690, 691, 692; 534/788
See application file for complete search history.

(56) References Cited

FOREIGN PATENT DOCUMENTS
| EP | 1411089 A1 | 4/2004 |
| GB | 1541010 A | 2/1979 |
| WO | WO-2005/056690 A1 | 6/2005 |
| WO | WO 2005/056690 A1 * | 6/2005 |

OTHER PUBLICATIONS
STIC Search Report dated Aug. 3, 2011.*
* cited by examiner

Primary Examiner — Eisa Elhilo
(74) Attorney, Agent, or Firm — Connolly Bove Lodge & Hutz LLP

(57) ABSTRACT

The invention provides for a dye of the formula (I)

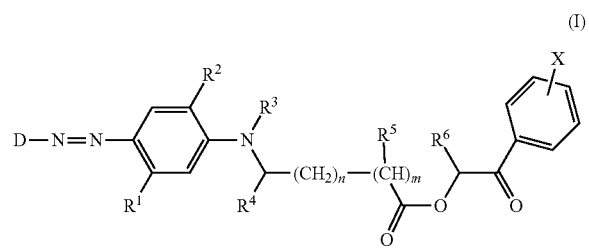

where
D is the residue of a diazo component;
$R^1$ is hydrogen, $(C_1-C_6)$-alkyl, $(C_1-C_4)$-alkoxy, hydroxyl, halogen, —NHCHO, —NHCO$(C_1-C_6)$-alkyl or —NHSO$_2$ $(C_1-C_6)$-alkyl; $R^2$ is hydrogen, $(C_1-C_6)$-alkyl, $(C_1-C_4)$-alkoxy or halogen; $R^3$ is hydrogen, $(C_1-C_6)$-alkyl, substituted $(C_1-C_6)$-alkyl, $(C_3-C_4)$-alkenyl or substituted $(C_3-C_4)$-alkenyl or $R^2$ and $R^3$ combine to form the radical —C*H(CH$_3$)CH$_2$C(CH$_3$)$_2$—, where the carbon atom marked * is attached to the phenyl nucleus; $R^4$ is hydrogen or $(C_1-C_6)$-alkyl; $R^5$ is hydrogen or $(C_1-C_6)$-alkyl; $R^6$ is hydrogen or $(C_1-C_6)$-alkyl; X is phenyl, thiophenyl, sulfonylphenyl or phenoxy; n is 0, 1, or 2; and m is 0 or 1. The invention is also related to the process of using the dye and the process of preparing the dye.

8 Claims, No Drawings

DISPERSE DYES, THEIR PREPARATION AND USE

CROSS-REFERENCE TO RELATED APPLICATIONS

This application is a national stage application (under 35 U.S.C. §371) of PCT/EP2008/060114, filed Aug. 1, 2008, which claims benefit of German application 10 2007 037522.2, filed Aug. 9, 2007.

BACKGROUND OF THE INVENTION

The present invention relates to disperse azo dyes in which a phenacyl ester is linked to the chromophore. Dyes comprising this structural element are already known and are described for example in WO05/056690.

BRIEF SUMMARY OF THE INVENTION

It has now been found that disperse azo dyes in which the phenacyl ester is substituted by a further phenyl or phenoxy radical have outstanding properties and that dyeings prepared therewith are notable for good washfastnesses and outstanding sublimation fastnesses. More particularly, such dyeings meet the special requirements of industrial laundering, where textiles are exposed to high temperatures after the wash cycle.

We have found that, surprisingly, despite their relatively high molecular weight, the dyes of the present invention go readily onto polyester and polyester blend fabrics.

The present invention provides dyes of the general formula (I)

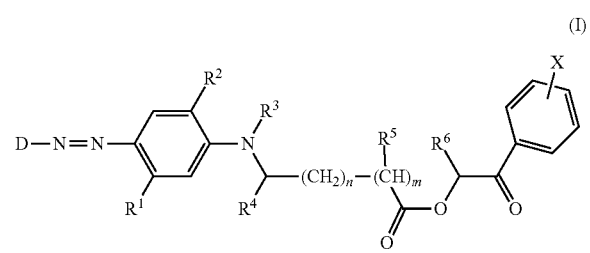

where
D is the residue of a diazo component;
$R^1$ is hydrogen, $(C_1-C_6)$-alkyl, $(C_1-C_4)$-alkoxy, hydroxyl, halogen, —NHCHO, —NHCO$(C_1-C_6)$-alkyl or —NHSO$_2(C_1-C_6)$-alkyl;
$R^2$ is hydrogen, $(C_1-C_6)$-alkyl, $(C_1-C_4)$-alkoxy or halogen;
$R^3$ is hydrogen, $(C_1-C_6)$-alkyl, substituted $(C_1-C_6)$-alkyl, $(C_3-C_4)$-alkenyl or substituted $(C_3-C_4)$-alkenyl; or
$R^2$ and $R^3$ combine to form the radical —C*H(CH$_3$)CH$_2$C(CH$_3$)$_2$—, where the carbon atom marked * is attached to the phenyl nucleus;
$R^4$ is hydrogen or $(C_1-C_6)$-alkyl;
$R^5$ is hydrogen or $(C_1-C_6)$-alkyl;
$R^6$ is hydrogen or $(C_1-C_6)$-alkyl;
X is phenyl, thiophenyl, sulfonylphenyl or phenoxy;
n is 0, 1, or 2; and
m is 0 or 1.

DETAILED DESCRIPTION OF THE INVENTION

Residues D of a diazo component are in particular the residues customary in the field of disperse dyes and known to one skilled in the art.

Preferably, D represents a group of the formula (IIa)

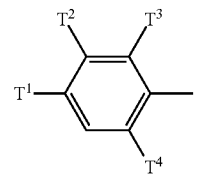

where
$T^1$ and $T^2$ are independently hydrogen, halogen, $(C_1-C_4)$-alkyl, $(C_1-C_4)$-alkoxy, cyano, —SO$_2(C_1-C_4)$-alkyl or nitro; and
$T^4$ and $T^3$ are independently hydrogen, halogen, trifluoromethyl, cyano, —SO$_2$CH$_3$, —SCN or nitro;
with the proviso that at least one of $T^1$, $T^2$, $T^3$ and $T^4$ is not hydrogen; or represents a group of the formula (IIb)

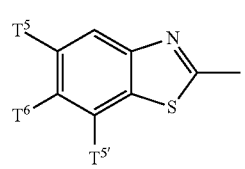

where
$T^5$ and $T^{5'}$ are independently hydrogen or halogen; and
$T^6$ is hydrogen, —SO$_2$CH$_3$, —SCN, $(C_1-C_4)$-alkoxy, halogen, cyano or nitro;
with the proviso that at least one of $T^5$, $T^{5'}$ and $T^6$ is not hydrogen; or represents a group of the formula (IIc)

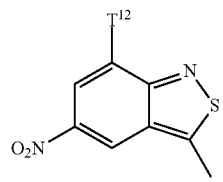

where
$T^{12}$ is hydrogen or halogen;
or represents a group of the formula (IId)

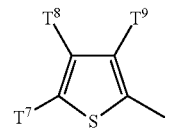

where
$T^7$ is nitro, —CHO, —COCH$_3$, cyano or a group of the formula

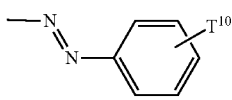

where $T^{10}$ is hydrogen, halogen, nitro or cyano;

$T^8$ is hydrogen, $(C_1-C_6)$-alkyl or halogen; and $T^9$ is nitro, cyano, —$COCH_3$ or —$COOT^{11}$; where $T^{11}$ is $(C_1-C_4)$-alkyl; or represents a group of the formula (IIe)

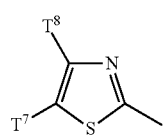
(IIe)

where $T^7$ and $T^8$ are each as defined above;

or represents a group of the formula (IIf)

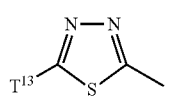
(IIf)

where $T^{13}$ is phenyl or $(C_1-C_4)$-alkylthio;

or represents a group of the formula (IIg)

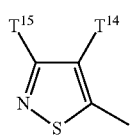
(IIg)

where $T^{14}$ is cyano or —$COCH_3$ or —$COOT^{11}$, where $T^{11}$ is $(C_1-C_4)$-alkyl; and $T^{15}$ is phenyl or $(C_1-C_4)$-alkyl;

or represents a group of the formula (IIh)

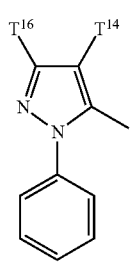
(IIh)

where $T^{14}$ is as defined above and $T^{16}$ is $(C_1-C_4)$-alkyl;

or represents a group of the formula (IIi)

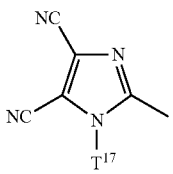
(IIi)

where $T^{17}$ is cyanomethyl, benzyl or allyl;

or represents a group of the formula (IIj)

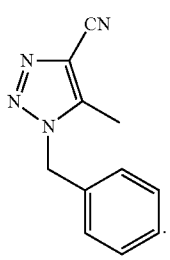
(IIj)

$(C_1-C_6)$-Alkyl groups $R^1$ to $R^7$ may be straight chain or branched and are for example methyl, ethyl, n-propyl, i-propyl, n-butyl, i-butyl, tert-butyl, n-pentyl or n-hexyl. Analogous considerations apply to $(C_1-C_6)$-alkoxy.

Substituted $(C_1-C_6)$-alkyl groups $R^3$ are substituted in particular by 1 to 3 substituents selected from the group consisting of halogen, cyano, hydroxyl, $(C_1-C_6)$-alkoxy, —COO$(C_1-C_6)$-alkyl, —OCOO$(C_1-C_6)$-alkyl and —OCO$(C_1-C_6)$-alkyl.

A $(C_3-C_4)$-alkenyl group $R^3$ is in particular allyl.

Halogen is preferably chlorine or bromine.

$R^1$ is preferably hydrogen, chlorine, methyl, ethyl, hydroxyl, methoxy, ethoxy, acetylamine, propionylamino, methylsulfonylamino or ethylsulfonylamino.

$R^2$ is preferably hydrogen, chlorine, methyl, ethyl, methoxy or ethoxy.

$R^3$ is preferably hydrogen, methyl, ethyl, propyl, butyl, methoxyethyl, cyanoethyl, $C_2H_4OCOCH_3$, $C_2H_4OCOC_2H_5$, $C_2H_4COOCH_3$, $C_2H_4COOC_2H_5$ or allyl.

$R^4$, $R^5$ and $R^6$ are each preferably methyl or hydrogen, more preferably hydrogen.

X is preferably phenyl or phenoxy and more preferably phenyl.

n is preferably 0 or 1, more preferably 0.

m is preferably 1.

m+n is preferably 1.

Preferred dyes of the present invention conform to the general formula (Ia)

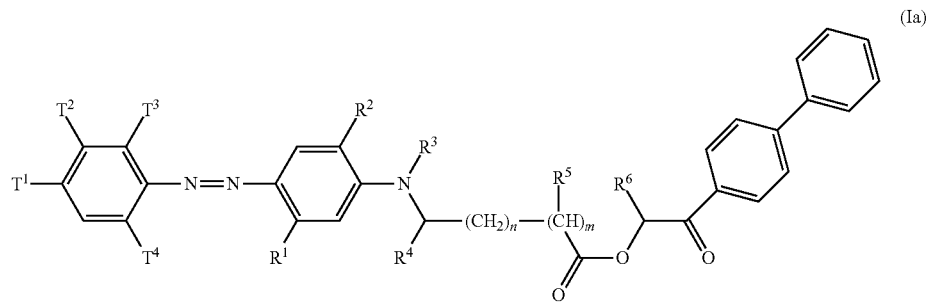
(Ia)

where $T^1$ to $T^4$, $R^1$ to $R^6$, m and n are each as defined above.

Particularly preferred dyes of this type according to the present invention conform to the general formula (Iaa)

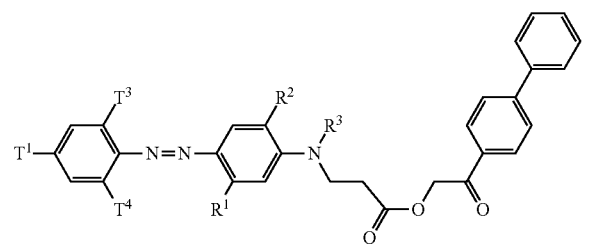
(Iaa)

where
- $T^1$ is nitro;
- $T^3$ is hydrogen, cyano, chlorine or bromine;
- $T^4$ is hydrogen, cyano, nitro, chlorine, bromine or trifluoromethyl;
- $R^1$ is hydrogen, hydroxyl, methyl, acetylamino or propionylamino;
- $R^2$ is hydrogen, chlorine, methyl or methoxy;
- $R^3$ is hydrogen, methyl, ethyl, butyl or allyl.

Further preferred dyes of the present invention conform to the general formula (Ib)

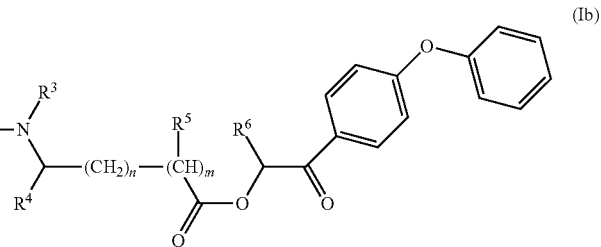
(Ib)

where $T^1$ to $T^4$, $R^1$ to $R^6$, m and n are each as defined above.

Particularly preferred dyes of this type according to the present invention conform to the general formula (Iba)

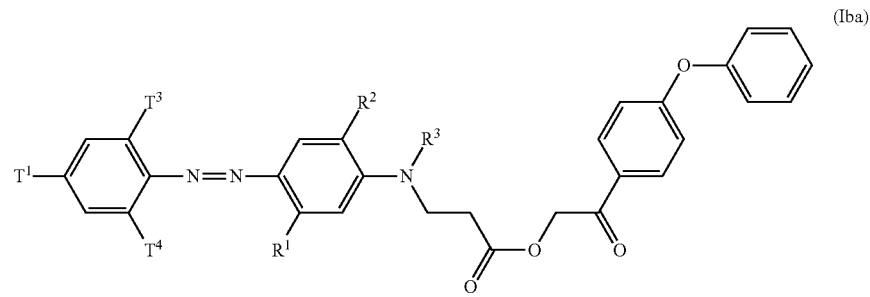
(Iba)

where
T$^1$ is nitro;
T$^3$ is hydrogen, cyano, chlorine or bromine;
T$^4$ is hydrogen, cyano, nitro, chlorine, bromine or trifluoromethyl;
R$^1$ is hydrogen, hydroxyl, methyl, acetylamino or propionylamino;
R$^2$ is hydrogen, chlorine, methyl or methoxy;
R$^3$ is hydrogen, methyl, ethyl, butyl or allyl.

The dyes of the general formula (I) according to the present invention can be prepared by methods known to one skilled in the art. For instance, a compound of the general formula (III)

where D is as defined above, is diazotized and coupled onto a compound of the general formula (IV)

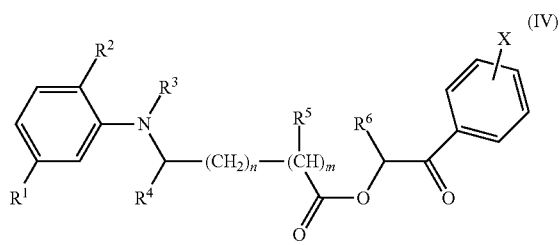

where R$^1$ to R$^6$, X, m and n are each as defined above.

The compounds of the general formula (III) are generally diazotized in a known manner, for example with sodium nitrite in an acidic aqueous medium, for example in an aqueous medium rendered acidic with hydrochloric acid or sulfuric acid, or with nitrosylsulfuric acid in dilute sulfuric acid, phosphoric acid or a mixture of acetic and propionic acids. The preferred temperature range is between 0° C. and 15° C.

The diazotized compounds are generally likewise coupled onto the compounds of the general formula (IV) in a known manner, for example in an acidic, aqueous, aqueous-organic or organic medium, with particular advantage at temperatures below 10° C. Acids used are in particular sulfuric acid, acetic acid or propionic acid.

The compounds of the general formulae (III) and (IV) are known and can be prepared by known methods.

The dyes of the general formula (I) according to the present invention are outstandingly useful for dyeing and printing hydrophobic materials in that the dyeings and prints obtained are notable for level shades and high service fastnesses. Deserving of emphasis are good washfastnesses, in particular those in combination with very good sublimation fastnesses.

It has further been determined that the disperse dyes of the present invention are outstandingly useful for the continuous dyeing of polyester-cotton blends as used for workwear for example. The wetfastnesses achieved, in particular according to the "Hoechst combination test" which is particularly relevant for this application and wherein the dyed material is exposed to temperatures of 190° C. for 5 minutes before the ISO 105-C05 test, are outstanding.

The present invention thus also provides for the use of the dyes of the general formula I for dyeing and printing hydrophobic materials, and processes for dyeing or printing such materials in conventional procedures which utilize as colorants one or more dyes of the general formula (I) according to the present invention.

The hydrophobic materials mentioned can be of synthetic or cellulosic origin. Hydrophobic materials contemplated include for example secondary cellulose acetate, cellulose triacetate, polyamides and, in particular, macromolecular polyesters. Materials composed of macromolecular polyester are in particular those based on polyethylene glycol terephthalates.

The hydrophobic synthetic materials may be in the form of sheet- or thread-shaped structures and may have been processed for example into yarns or woven or knit textile fabrics. Preference is given to fibrous textile materials, which can also be present in the form of microfibers for example.

The dyeing in accordance with the use according to the present invention can be effected in a conventional manner, preferably from an aqueous dispersion, if appropriate in the presence of carriers, between 80 to about 110° C. by the exhaust method or by the HT method in a dyeing autoclave at 110 to 140° C., and also by the so-called thermofix method in which the fabric is padded with the dyeing liquor and subsequently fixed/set at about 180 to 230° C.

Printing of the materials mentioned can be carried out in a manner known per se by incorporating the dyes of the general formula (I) of the present invention in a print paste and treating the fabric printed therewith at temperatures between 180 to 230° C. with HT steam, high-pressure steam or dry heat, if appropriate in the presence of a carrier, to fix the dye.

The dyes of the general formula (I) of the present invention shall be in a very fine state of subdivision when they are used in dyeing liquors, padding liquors or print pastes.

The dyes are converted into the fine state of subdivision in a conventional manner by slurrying the as-fabricated dye together with dispersants in a liquid medium, preferably in water, and subjecting the mixture to the action of shearing forces to mechanically comminute the original dye particles to such an extent that an optimal specific surface area is achieved and sedimentation of the dye is minimized. This is accomplished in suitable mills, such as ball or sand mills. The particle size of the dyes is generally between 0.5 and 5 μm and preferably equal to about 1 μm.

The dispersants used in the milling operation can be nonionic or anionic. Nonionic dispersants include for example reaction products of alkylene oxides, for example ethylene oxide or propylene oxide, with alkylatable compounds, for example fatty alcohols, fatty amines, fatty acids, phenols, alkylphenols and carboxamides. Anionic dispersants are for example lignosulfonates, alkyl- or alkylarylsulfonates or alkylaryl polyglycol ether sulfates.

The dye preparations thus obtained shall be pourable for most applications. Accordingly, the dye and dispersant content is limited in these cases. In general, the dispersions are adjusted to a dye content up to 50 percent by weight and a dispersant content up to about 25 percent by weight. For economic reasons, dye contents are in most cases not below 15 percent by weight.

The dispersions may also contain still further auxiliaries, for example those which act as oxidizing agents, for example sodium m-nitrobenzenesulfonate, or fungicidal agents, for example sodium o-phenylphenoxide and sodium pentachlorophenoxide, and particularly so-called "acid donors", examples being butyrolactone, monochloroacetamide, sodium chloroacetate, sodium dichloroacetate, the sodium salt of 3-chloropropionic acid, monosulfate esters such as lauryl sulfate for example, and also sulfuric esters of ethoxylated and propoxylated alcohols, for example butylglycol sulfate.

The dye dispersions thus obtained are very advantageous for making up dyeing liquors and print pastes.

There are certain fields of use where powder formulations are preferred. These powders comprise the dye, dispersants and other auxiliaries, for example wetting, oxidizing, preserving and dustproofing agents and the abovementioned "acid donors".

A preferred method of making pulverulent preparations of dye consists in stripping the above-described liquid dye dispersions of their liquid, for example by vacuum drying, freeze drying, by drying on drum dryers, but preferably by spray drying.

The dyeing liquors are made by diluting the requisite amounts of the above-described dye formulations with the dyeing medium, preferably water, such that a liquor ratio of 5:1 to 50:1 is obtained for dyeing. In addition, it is generally customary to include further dyeing auxiliaries, such as dispersing, wetting and fixing auxiliaries, in the liquors. Organic and inorganic acids such as acetic acid, succinic acid, boric acid or phosphoric acid are included to set a pH in the range from 4 to 5, preferably 4.5. It is advantageous to buffer the pH setting and to add a sufficient amount of a buffering system. The acetic acid/sodium acetate system is an example of an advantageous buffering system.

To use the dye or dye mixture in textile printing, the requisite amounts of the abovementioned dye formulations are kneaded in a conventional manner together with thickeners, for example alkali metal alginates or the like, and if appropriate further additives, for example fixation accelerants, wetting agents and oxidizing agents, to give print pastes.

The present invention also provides inks for digital textile printing by the ink jet process, comprising a present invention dye of the general formula (I).

The inks of the present invention are preferably aqueous and comprise one or more of the present invention's dyes of the general formula (I), for example in amounts of 0.1% to 50% by weight, preferably in amounts of 1% to 30% by weight and more preferably in amounts of 1% to 15% by weight based on the total weight of the ink. They further comprise in particular from 0.1% to 20% by weight of a dispersant. Suitable dispersants are known to one skilled in the art, are commercially available and include for example sulfonated or sulfomethylated lignins, condensation products of aromatic sulfonic acids and formaldehyde, condensation products of substituted or unsubstituted phenol and formaldehyde, polyacrylates and corresponding copolymers, modified polyurethanes and reaction products of alkylene oxides with alkylatable compounds, for example fatty alcohols, fatty amines, fatty acids, carboxamides and substituted or unsubstituted phenols.

The inks of the present invention may further comprise customary additives, for example viscosity moderators to set viscosities in the range from 1.5 to 40.0 mPas in a temperature range of 20 to 50° C. Preferred inks have a viscosity in the range from 1.5 to 20 mPas and particularly preferred inks have a viscosity in the range from 1.5 to 15 mPas.

Useful viscosity moderators include rheological additives, for example polyvinyl-caprolactam, polyvinylpyrrolidone and also their copolymers, polyetherpolyol, associative thickeners, polyureas, sodium alginates, modified galactomannans, polyetherurea, polyurethane and nonionic cellulose ethers.

By way of further additives, the inks of the present invention may include surface-active substances to set surface tensions in the range from 20 to 65 mN/m, which are if appropriate adapted depending on the process used (thermal or piezo technology). Useful surface-active substances include for example surfactants of any kind, preferably nonionic surfactants, butyldiglycol and 1,2 hexanediol.

The inks may further include customary additives, for example chemical species to inhibit fungal and bacterial growth in amounts from 0.01% to 1% by weight based on the total weight of the ink.

The inks of the present invention can be prepared in conventional manner by mixing the components in water.

Example 1

66.2 g of 6-bromo-2,4-dinitroaniline are suspended in 185 ml of acetic acid at room temperature. 7.5 ml of sulfuric acid (96%) are added with slight cooling. 45 ml of nitrosylsulfuric acid (40%) are added dropwise at 15-20° C. The mixture is subsequently stirred at 15-20° C. for one hour. The diazonium salt solution thus obtained is added dropwise to a mixture of 111.6 g of 2-biphenyl-4-yl-2-oxoethyl 3-(5-acetylamino-2-methoxyphenylamino)propionate, 1 l of acetone and 10 g of urea at 5-10° C. in the course of one hour. This is followed by stirring for one hour, diluting with 500 ml of water, filtering off with suction, washing with water and drying to leave 86g of the dye of the formula (Iab)

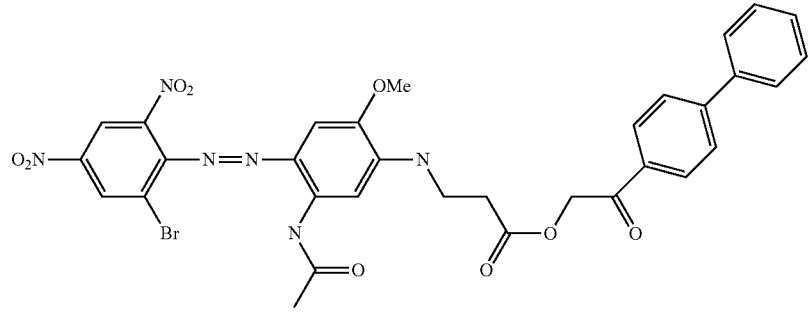

($\lambda_{max}$[DMF]=594 nm) which produces blue shades having good washfastnesses and sublimation fastnesses on polyester.

Example 2

51.6 g of 2-chloro-4-nitroaniline are stirred up with 100 ml of water and 85 ml of hydrochloric acid (30%) at room temperature for 18 hours. After additions of 160 g of ice, 40 ml of nitrite solution (53 g/l) are added over 1-2 minutes. The mixture is subsequently stirred at not more than 5° C. for 2 hours and excess nitrite is subsequently destroyed with amidosulfonic acid. The diazonium salt solution thus obtained is added dropwise to a solution of 116.3 g of 2-biphenyl-4-yl-2-oxoethyl 3-(ethylphenylamino)propionate in 1.4 l of acetone at 0-5° C. in the course of an hour.

The mixture is subsequently stirred at 5-10° C. for 18 hours and poured onto 6.5 l of water. The precipitate is filtered off with suction, washed with water and dried to leave 167 g of the dye of the formula (Iac)

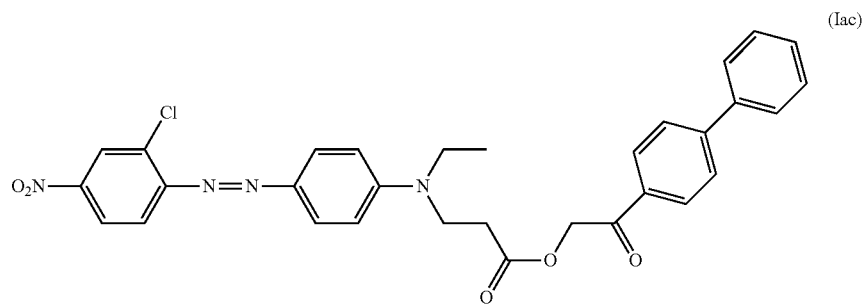

(Iac)

($\lambda_{max}$[DMF]=514 nm) which produces red shades having good washfastnesses and excellent sublimation fastnesses on polyester.

Example 3

14.3 g of 2-biphenyl-4-yl-2-oxoethyl 3-{[3-acetylamino-4-(2-bromo-4,6-dinitrophenylazo)phenyl]
ethylamino}propionate and 1.9 g of copper(I) cyanide are stirred in 80 ml of N-methylpyrrolidone at 100° C. for 2 hours. After cooling, 250 ml of methanol are added dropwise to the batch. The precipitate is filtered off with suction, and washed with a little methanol and water. The water-moist solid is stirred in 150 ml of hydrochloric acid (10%) for one hour, filtered off with suction and washed with water. Drying under reduced pressure leaves 8.8 g of the dye of the formula (Iad)

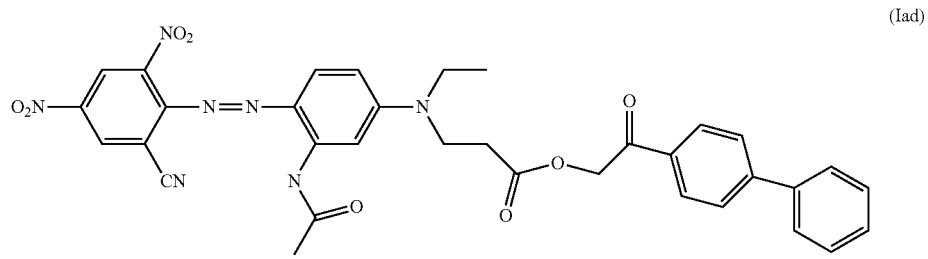

(Iad)

($\lambda_{max}$[DMF]=602 nm) which dyes polyester in brilliant blue shades and has good washfastnesses and excellent sublimation fastnesses.

The compounds of Examples 4 to 45 in Table 1 were prepared similarly to the processes described in Examples 1 to 3.

TABLE 1

| Example | $T^1$ | $T^2$ | $T^3$ | $T^4$ | $R^1$ | $R^2$ | $R^3$ | $R^4$ | $R^5$ | n | m | X | $\lambda_{max}$ (nm) DMF |
|---|---|---|---|---|---|---|---|---|---|---|---|---|---|
| 4  | $NO_2$ | H | Br | $NO_2$ | $NHCOCH_3$ | $OCH_3$ | $CH_2CH_3$ | H | H | 0 | 1 | $C_6H_5$ | 604 |
| 5  | $NO_2$ | H | Cl | $NO_2$ | $NHCOCH_3$ | $OCH_3$ | $CH_2CH_3$ | H | H | 0 | 1 | $C_6H_5$ | 604 |
| 6  | $NO_2$ | H | H  | $NO_2$ | $NHCOCH_3$ | $OCH_3$ | $CH_2CH_3$ | H | H | 0 | 1 | $C_6H_5$ | 582 |
| 7  | $NO_2$ | H | Br | $NO_2$ | $NHCOCH_3$ | $OCH_3$ | $CH_2CH_3$ | H | H | 0 | 0 | $C_6H_5$ | 590 |
| 8  | $NO_2$ | H | Cl | $NO_2$ | $NHCOCH_3$ | $OCH_3$ | H | H | H | 2 | 0 | $C_6H_5$ | 600 |
| 9  | $NO_2$ | H | Cl | $NO_2$ | $NHCOCH_3$ | $OCH_3$ | $CH_2CH=CH_2$ | H | H | 0 | 1 | $C_6H_5$ | 598 |
| 10 | $NO_2$ | H | Cl | $NO_2$ | $NHCOCH_3$ | $OCH_3$ | $CH_3$ | H | H | 0 | 1 | $C_6H_5$ | 600 |
| 11 | $NO_2$ | H | Cl | $NO_2$ | $NHCOCH_3$ | $OCH_3$ | H | H | H | 0 | 1 | $C_6H_5$ | 594 |
| 12 | $NO_2$ | H | Br | $NO_2$ | $NHCOCH_3$ | $OCH_3$ | H | H | H | 0 | 1 | $OC_6H_5$ | 594 |
| 13 | $NO_2$ | H | Cl | $NO_2$ | $NHCOC_2H_5$ | $OCH_3$ | H | H | H | 0 | 1 | $C_6H_5$ | 594 |
| 14 | $NO_2$ | H | Br | CN | $NHCOCH_3$ | $OCH_3$ | H | H | H | 0 | 1 | $C_6H_5$ | 624 |
| 15 | $NO_2$ | H | Cl | $NO_2$ | $NHCOCH_3$ | $OCH_3$ | H | $CH_3$ | H | 0 | 1 | $C_6H_5$ | 596 |
| 16 | $NO_2$ | H | Cl | $NO_2$ | $NHCOCH_3$ | $OCH_3$ | H | H | $CH_3$ | 0 | 1 | $C_6H_5$ | 592 |
| 17 | $NO_2$ | H | H  | $NO_2$ | $NHCOCH_3$ | H | $CH_2CH_3$ | H | H | 0 | 1 | $C_6H_5$ | 548 |
| 18 | $NO_2$ | H | Cl | $NO_2$ | $NHCOCH_3$ | H | $CH_2CH_3$ | H | H | 0 | 1 | $C_6H_5$ | 560 |
| 19 | $NO_2$ | H | CN | $NO_2$ | $NHCOCH_3$ | H | $CH_2CH_3$ | H | H | 0 | 0 | $C_6H_5$ | 584 |
| 20 | $NO_2$ | H | Br | $NO_2$ | $NHCOCH_3$ | H | $CH_2CH_3$ | H | H | 0 | 1 | $C_6H_5$ | 558 |
| 21 | $NO_2$ | H | H  | CN | $NHCOCH_3$ | H | $CH_2CH_3$ | H | H | 0 | 1 | $C_6H_5$ | 552 |
| 22 | $NO_2$ | H | Br | CN | $NHCOCH_3$ | H | $CH_2CH_3$ | H | H | 0 | 1 | $C_6H_5$ | 584 |
| 23 | $NO_2$ | H | H  | Cl | $NHCOCH_3$ | H | $CH_2CH_3$ | H | H | 0 | 1 | $C_6H_5$ | 534 |
| 24 | $NO_2$ | H | H  | Cl | $NHCOCH_3$ | H | n-butyl | H | H | 0 | 1 | $C_6H_5$ | 534 |
| 25 | $NO_2$ | H | H  | H  | $NHCOCH_3$ | H | $CH_2CH_3$ | H | H | 0 | 1 | $C_6H_5$ | 514 |
| 26 | $NO_2$ | H | H  | H  | $NHCOCH_3$ | Cl | H | H | H | 0 | 1 | $C_6H_5$ | 450 |
| 27 | $NO_2$ | H | H  | CN | $CH_3$ | H | $CH_2CH_3$ | H | H | 0 | 1 | $C_6H_5$ | 548 |
| 28 | $NO_2$ | H | H  | Cl | $CH_3$ | H | $CH_2CH_3$ | H | H | 0 | 1 | $C_6H_5$ | 524 |
| 29 | $NO_2$ | H | Cl | Cl | $CH_3$ | H | $CH_2CH_3$ | H | H | 0 | 1 | $C_6H_5$ | 462 |
| 30 | $NO_2$ | H | Br | Cl | $CH_3$ | H | $CH_2CH_3$ | H | H | 0 | 1 | $C_6H_5$ | 460 |
| 31 | $NO_2$ | H | CN | CN | $CH_3$ | H | $CH_2CH_3$ | H | H | 0 | 1 | $C_6H_5$ | 598 |
| 32 | $NO_2$ | H | CN | CN | $CH_3$ | H | n-butyl | H | H | 0 | 1 | $C_6H_5$ | 600 |
| 33 | $NO_2$ | H | Br | CN | $CH_3$ | H | $CH_2CH_3$ | H | H | 0 | 1 | $C_6H_5$ | 560 |
| 34 | $NO_2$ | H | H  | CN | H | H | $CH_2CH_3$ | H | H | 0 | 1 | $C_6H_5$ | 536 |
| 35 | $NO_2$ | H | H  | CN | H | H | n-propyl | H | H | 0 | 1 | $C_6H_5$ | 538 |
| 36 | $NO_2$ | H | Cl | Cl | H | H | $CH_2CH_3$ | H | H | 0 | 1 | $C_6H_5$ | 442 |
| 37 | $NO_2$ | H | Br | Cl | H | H | $CH_2CH_3$ | H | H | 0 | 1 | $C_6H_5$ | 440 |
| 38 | $NO_2$ | H | H  | H  | H | H | $CH_2CH_3$ | H | H | 0 | 1 | $C_6H_5$ | 488 |
| 39 | $NO_2$ | H | H  | H  | H | H | $CH_2CH_3$ | H | H | 0 | 0 | $C_6H_5$ | 476 |
| 40 | $NO_2$ | H | H  | CN | H | H | $CH_2CH_3$ | H | H | 0 | 0 | $C_6H_5$ | 522 |
| 41 | $NO_2$ | H | H  | Cl | H | H | $CH_2CH_3$ | H | H | 0 | 1 | $OC_6H_5$ | 514 |
| 42 | $NO_2$ | H | H  | H  | H | Cl | H | H | H | 0 | 1 | $C_6H_5$ | 452 |
| 43 | $NO_2$ | Cl | H  | Cl | H | H | $CH_2CH_3$ | H | H | 0 | 1 | $C_6H_5$ | 510 |
| 44 | H | $NO_2$ | H | H | $CH_3$ | H | $CH_2CH_3$ | H | H | 0 | 1 | $C_6H_5$ | 452 |
| 45 | $CH_3$ | H | CN | CN | $NHCOCH_3$ | H | $CH_2CH_3$ | H | H | 0 | 1 | $C_6H_5$ | 532 |

Example 46

6.5 g of 3-amino-5-nitrobenzisothiazole are introduced into a mixture of 16.6 ml of sulfuric acid (96%) and 6 ml of phosphoric acid (85%). Then, 6.9 ml of nitrosylsulfuric acid (40%) are added dropwise at 10 to 15° C. The mixture is subsequently stirred at 10 to 15° C. for 4 hours. The diazonium salt solution thus obtained is expeditiously added dropwise to a mixture of 12.9 g of 2-biphenyl-4-yl-2-oxoethyl 3-(ethylphenyl-amino)propionate, 250 ml of acetone, 1.7 g of urea at 0-5° C. This is followed by stirring at room temperature overnight, filtering off with suction and washing with methanol and then with water and drying to leave 13.7 g of the dye of the formula (Ibb)

(Ibb)

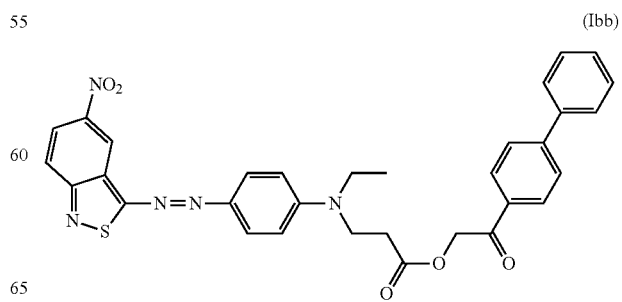

($\lambda_{max}$[DMF]=604 nm) which dyes polyester in blue shades and has very good washfastnesses and sublimation fastnesses.

The compounds of Examples 47 to 55 in Table 2 were prepared similarly to the process described in Example 46.

TABLE 2

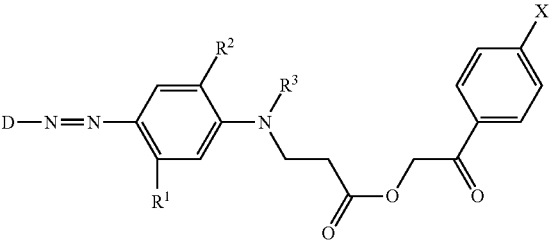

| Example | D | R¹ | R² | R³ | X | $\lambda_{max}$ [DMF] |
|---|---|---|---|---|---|---|
| 47 | 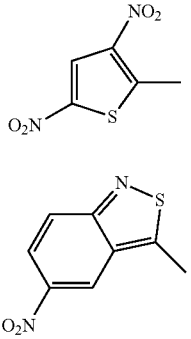 | H | H | $CH_2CH_3$ | $C_6H_5$ | 650 |
| 48 | 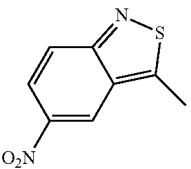 | H | H | $CH_3$ | $C_6H_5$ | 602 |
| 49 | 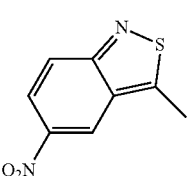 | $CH_3$ | H | $CH_2CH_3$ | $C_6H_5$ | 618 |
| 50 | 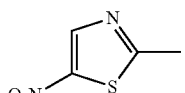 | $NHCOCH_3$ | Cl | H | $C_6H_5$ | 594 |
| 51 | 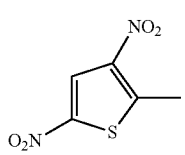 | $NHCOCH_3$ | H | $CH_2CH_3$ | $C_6H_5$ | 594 |
| 52 | 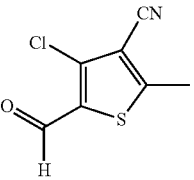 | $NHCOCH_3$ | H | $CH_2CH_3$ | $C_6H_5$ | 642 |
| 53 |  | $HNCOCH_3$ | H | $CH_2CH_3$ | $C_6H_5$ | 648 |

TABLE 2-continued

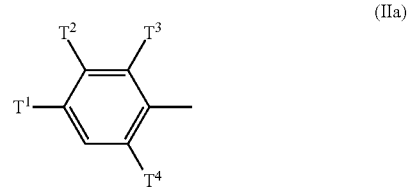

| Example | D | R$^1$ | R$^2$ | R$^3$ | X | $\lambda_{max}$ [DMF] |
|---------|---|-------|-------|-------|---|----------------------|
| 54 | 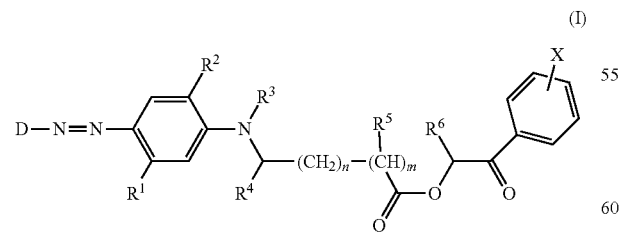 | CH$_3$ | H | CH$_2$CH$_3$ | C$_6$H$_5$ | 520 |
| 55 | | NHCOCH$_3$ | OCH$_3$ | CH$_2$C$_6$H$_5$ | C$_6$H$_5$ | 600 |

Example 56

A textile fabric consisting of polyester is padded with a liquor consisting of 50 g/l of 8% sodium alginate solution, 100 g/l of 8-12% carob flour ether solution and 5 g/l of monosodium phosphate in water and then dried. The wet pickup is 70%.

The textile thus pretreated is then printed with an aqueous ink prepared in accordance with the procedure described above and containing
3.5% of the dye of Example 1,
2.5% of Disperbyk 190 dispersant,
30% of 1,5-pentanediol,
5% of diethylene glycol monomethyl ether,
0.01% of Mergal K9N biocide, and
58.99% of water
using a drop-on-demand (piezo) ink jet print head. The print is fully dried. Fixing is effected by means of superheated steam at 175° C. for 7 minutes. The print is subsequently subjected to an alkaline reduction clear, rinsed warm and then dried.

What is claimed is:

1. A dye of the general formula (I)

where
D is the residue of a diazo component;
R$^1$ is hydrogen, (C$_1$-C$_6$)-alkyl, (C$_1$-C$_4$)-alkoxy, hydroxyl, halogen, —NHCHO, —NHCO(C$_1$-C$_6$)-alkyl or —NHSO$_2$(C$_1$-C$_6$)-alkyl;

R$^2$ is hydrogen, (C$_1$-C$_6$)-alkyl, (C$_1$-C$_4$)-alkoxy or halogen;
R$^3$ is hydrogen, (C$_1$-C$_6$)-alkyl, substituted (C$_1$-C$_6$)-alkyl, (C$_3$-C$_4$)-alkenyl or substituted (C$_3$-C$_4$)-alkenyl or R$^2$ and R$^3$ combine to form the radical —C*H(CH$_3$)CH$_2$C(CH$_3$)$_2$—, where the carbon atom marked * is attached to the phenyl nucleus;
R$^4$ is hydrogen or (C$_1$-C$_6$)-alkyl;
R$^5$ is hydrogen or (C$_1$-C$_6$)-alkyl;
R$^6$ is hydrogen or (C$_1$-C$_6$)-alkyl;
X is phenyl, thiophenyl, sulfonylphenyl or phenoxy;
n is 0, 1, or 2; and
m is 0 or 1.

2. The dye as claimed in claim 1 wherein D represents a group of the formula (IIa)

where
T$^1$ and T$^2$ are independently hydrogen, halogen, (C$_1$-C$_4$)-alkyl, (C$_1$-C$_4$)-alkoxy, cyano, —SO$_2$(C$_1$-C$_4$)-alkyl or nitro; and
T$^4$ and T$^3$ are independently hydrogen, halogen, trifluoromethyl, cyano, —SO$_2$CH$_3$, —SCN or nitro;
with the proviso that at least one of T$^1$, T$^2$, T$^3$ and T$^4$ is not hydrogen;

or represents a group of the formula (IIb)

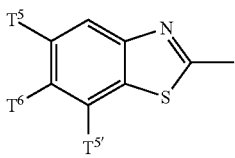
(IIb)

where
T⁵ and T⁵' are independently hydrogen or halogen; and
T⁶ is hydrogen, —SO₂CH₃, —SCN, (C₁-C₄)-alkoxy, halogen, cyano or nitro;
with the proviso that at least one of T⁵, T⁵' and T⁶ is not hydrogen;
or represents a group of the formula (IIc)

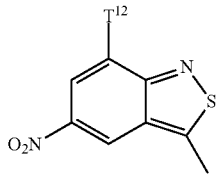
(IIc)

where
T¹² is hydrogen or halogen;
or represents a group of the formula (IId)

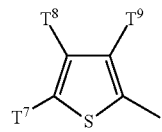
(IId)

where
T⁷ is nitro, —CHO, —COCH₃, cyano or a group of the formula

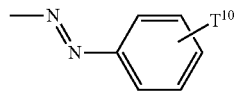

where T¹⁰ is hydrogen, halogen, nitro or cyano;
T⁸ is hydrogen, (C₁-C₆)-alkyl, phenyl or halogen; and
T⁹ is nitro, cyano, —COCH₃ or —COOT¹¹; where T¹¹ is (C₁-C₄)-alkyl;
or represents a group of the formula (IIe)

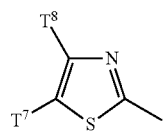
(IIe)

where T⁷ and T⁸ are each as defined above;
or represents a group of the formula (IIf)

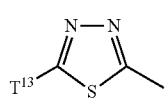
(IIf)

where T¹³ is phenyl or (C₁-C₄)-alkylthio;

or represents a group of the formula (IIg)

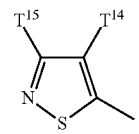
(IIg)

where T¹⁴ is cyano or —COCH₃ or —COOT¹¹, where T¹¹ is (C₁-C₄)-alkyl; and T¹⁵ is phenyl or (C₁-C₄)-alkyl;
or represents a group of the formula (IIh)

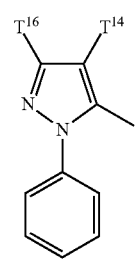
(IIh)

where T¹⁴ is as defined above and T¹⁶ is (C₁-C₄)-alkyl;
or represents a group of the formula (IIi)

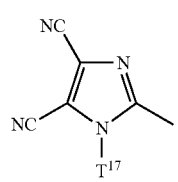
(IIi)

where T¹⁷ is cyanomethyl, benzyl or allyl;
or represents a group of the formula (IIj)

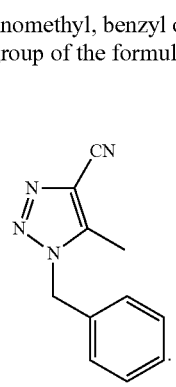
(IIj)

3. The dye as claimed in claim 1 wherein
R¹ is hydrogen, chlorine, methyl, ethyl, hydroxyl, methoxy, ethoxy, acetylamino, propionylamino, methylsulfonylamino, or ethylsulfonylamino;
R² is hydrogen, chlorine, methyl, ethyl, methoxy or ethoxy;
R³ is hydrogen, methyl, ethyl, propyl, butyl, methoxyethyl, cyanoethyl, C₂H₄OCOCH₃, C₂H₄OCOC₂H₅, C₂H₄COOCH₃, C₂H₄COOC₂H₅ or allyl;
R⁴, R⁵ and R⁶ are independently each methyl or hydrogen;
X is phenyl or phenoxy; and
m and n are each 0 or 1.

4. The dye as claimed in claim 2 conforming to the general formula (Ia)

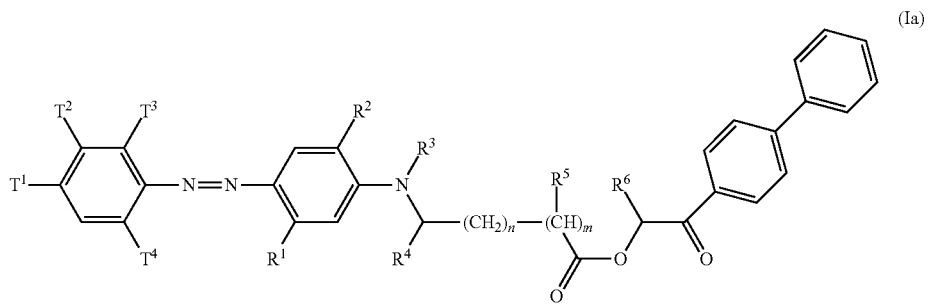

where $T^1$ to $T^4$, $R^1$ to $R^6$, X, m and n are each as defined in claim 2.

5. The dye as claimed in claim 1 conforming to the general formula (Iaa)

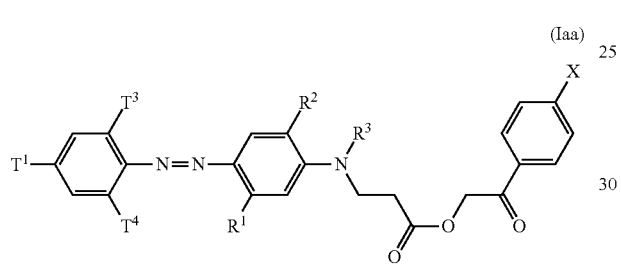

where
$T^1$ is nitro;
$T^3$ is hydrogen, cyano, chlorine or bromine;
$T^4$ is hydrogen, cyano, nitro, chlorine, bromine or trifluoromethyl;
$R^1$ is hydrogen, chlorine, hydroxyl, methyl, acetylamino or propionylamino;
$R^2$ is hydrogen, chlorine, methyl or methoxy;
$R^3$ is hydrogen, methyl, ethyl, butyl or allyl; and
X is phenyl or phenoxy.

6. A process for preparing the dye of the general formula (I) as claimed in claim 1, which comprises diazotizing and coupling a compound of the formula (III)

$$D\text{-}NH_2 \qquad (III)$$

where D is as defined in claim 1, being onto a compound of the formula (IV)

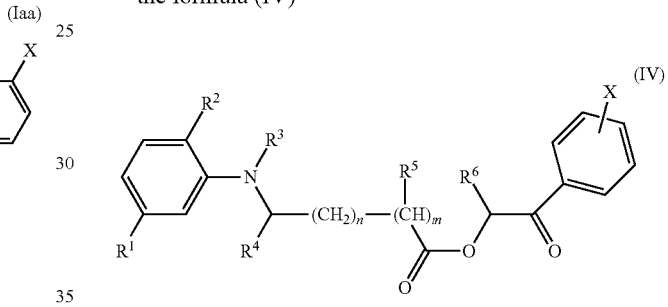

where $R^1$ to $R^6$, X, m and n are each as defined in claim 1.

7. A process for dyeing or printing hydrophobic materials which comprises contacting the dye as claimed in claim 1 with the material.

8. An ink for digital textile printing by the ink jet process, comprising the dye of the general formula (I) as claimed in claim 1.

* * * * *